(12) United States Patent
Pacher et al.

(10) Patent No.: US 9,858,571 B2
(45) Date of Patent: Jan. 2, 2018

(54) METHODS AND SYSTEMS FOR MITIGATING FRAUD LOSSES DURING A PAYMENT CARD TRANSACTION

(71) Applicant: MasterCard International Incorporated, Purchase, NY (US)

(72) Inventors: Frederick Michael Pacher, Williston Park, NY (US); Craig Robert Dinsmore, Des Peres, MO (US); Eoin Patrick Flood, Dublin (IE); Mikhail Blinov, Dun Laoghaire (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 610 days.

(21) Appl. No.: 13/732,977

(22) Filed: Jan. 2, 2013

(65) Prior Publication Data

US 2014/0188723 A1    Jul. 3, 2014

(51) Int. Cl.
*G06Q 40/00* (2012.01)
*G06Q 20/40* (2012.01)

(52) U.S. Cl.
CPC ......... *G06Q 20/401* (2013.01); *G06Q 20/405* (2013.01); *G06Q 20/4016* (2013.01)

(58) Field of Classification Search
None
See application file for complete search history.

(56) References Cited

U.S. PATENT DOCUMENTS 5,783,808 A * 7/1998 Josephson .............. G06Q 20/02
235/379
5,794,230 A * 8/1998 Horadan .............. G06Q 20/105
235/380
6,012,048 A * 1/2000 Gustin .................. G06Q 20/04
109/24.1
6,029,147 A * 2/2000 Horadan ................ G06Q 30/06
235/379

(Continued)

FOREIGN PATENT DOCUMENTS

| KR | 1020050038322 A | 4/2005 |
|---|---|---|
| WO | 2008117171 A1 | 10/2008 |
| WO | 2012158262 A1 | 11/2012 |

OTHER PUBLICATIONS

Bank Identification Number—BIN, Investopedia (BIN).*
PCT/US2013/076924 International Search Report and Written Opinion dated Apr. 22, 2014, (11 pages).

*Primary Examiner* — Chika Ojiaku
(74) *Attorney, Agent, or Firm* — Armstrong Teasdale LLP

(57) ABSTRACT

Computer systems and methods for identifying a potentially fraudulent payment card transaction in progress, and mitigating losses arising from completion of a fraudulent payment card transaction are provided. The computer system is programmed to receive an authorization request message for authorization of a payment card-initiated transaction, when the transaction is initiated using a payment card that includes a first security device operable for transactions initiated within a predefined geographic region and a second security device operable for transactions initiated both within the predefined geographic region and outside of the predefined geographic region. When the transaction is initiated outside the predefined geographic region, the computer system compares data on the payment card to stored data corresponding to a plurality of payment cards previously-approved for transactions outside of the predefined geographic region approval, and applies one or more sets of rules to the transaction as appropriate.

9 Claims, 7 Drawing Sheets

(56) References Cited

U.S. PATENT DOCUMENTS

| | | | |
|---|---|---|---|
| 6,032,137 A * | 2/2000 | Ballard | G06K 9/00973 705/75 |
| 7,233,942 B2 | 6/2007 | Nye | |
| 7,433,980 B1 * | 10/2008 | Fischaber | G11C 7/1006 365/189.02 |
| 7,707,089 B1 * | 4/2010 | Barton et al. | 705/35 |
| 7,761,568 B1 | 7/2010 | Levi et al. | |
| 7,857,212 B1 * | 12/2010 | Matthews | 235/380 |
| 2002/0013711 A1 * | 1/2002 | Ahuja | G06Q 40/02 709/206 |
| 2002/0152180 A1 * | 10/2002 | Turgeon | G06Q 20/04 705/72 |
| 2002/0194119 A1 * | 12/2002 | Wright et al. | 705/38 |
| 2003/0028481 A1 * | 2/2003 | Flitcroft | G06Q 20/00 705/39 |
| 2003/0110129 A1 * | 6/2003 | Frazier | G06Q 20/04 705/40 |
| 2003/0182194 A1 * | 9/2003 | Choey | G06Q 20/04 705/16 |
| 2003/0229584 A1 * | 12/2003 | Brown | G06Q 20/04 705/39 |
| 2004/0098351 A1 * | 5/2004 | Duke | G06Q 20/04 705/65 |
| 2004/0117300 A1 * | 6/2004 | Jones et al. | 705/39 |
| 2004/0153336 A1 * | 8/2004 | Virdee | G06F 19/328 705/2 |
| 2004/0153399 A1 * | 8/2004 | Wilkes | G06Q 20/10 705/39 |
| 2005/0133587 A1 * | 6/2005 | Michelassi | G06Q 20/042 235/379 |
| 2005/0137982 A1 * | 6/2005 | Michelassi | G06Q 20/04 705/50 |
| 2005/0149440 A1 * | 7/2005 | Michelassi | G06Q 30/02 705/45 |
| 2005/0171898 A1 * | 8/2005 | Bishop | G06Q 20/00 705/39 |
| 2006/0136332 A1 * | 6/2006 | Ziegler | G06F 21/31 705/39 |
| 2006/0237528 A1 * | 10/2006 | Bishop | G06Q 20/32 235/380 |
| 2007/0057039 A1 | 3/2007 | Carlson et al. | |
| 2007/0174448 A1 * | 7/2007 | Ahuja | G06Q 10/10 709/224 |
| 2007/0244633 A1 | 10/2007 | Phillips et al. | |
| 2008/0010203 A1 * | 1/2008 | Grant | G06Q 20/102 705/44 |
| 2008/0109358 A1 * | 5/2008 | Kottmeier et al. | 705/44 |
| 2008/0235122 A1 * | 9/2008 | Weitzman | G06Q 40/02 705/35 |
| 2009/0012898 A1 | 1/2009 | Sharma et al. | |
| 2009/0045251 A1 * | 2/2009 | Jaiswal | G06Q 20/24 235/379 |
| 2009/0078757 A1 * | 3/2009 | Hanson | H04L 41/046 235/380 |
| 2011/0047075 A1 | 2/2011 | Fourez | |
| 2011/0131122 A1 * | 6/2011 | Griffin | G06Q 40/00 705/35 |
| 2011/0202466 A1 * | 8/2011 | Carter | G06Q 20/20 705/67 |
| 2012/0109802 A1 * | 5/2012 | Griffin | G06Q 40/00 705/35 |
| 2012/0296818 A1 * | 11/2012 | Nuzzi et al. | 705/41 |
| 2012/0296824 A1 | 11/2012 | Rosano | |
| 2013/0103577 A1 * | 4/2013 | Lawson | G06Q 20/10 705/39 |
| 2014/0074724 A1 * | 3/2014 | Gordon | G06Q 20/3829 705/71 |

* cited by examiner

METHODS AND SYSTEMS FOR MITIGATING FRAUD LOSSES DURING A PAYMENT CARD TRANSACTION

BACKGROUND OF THE INVENTION

The field of the invention relates generally to methods and systems for preventing fraud during payment card transactions, and, more particularly, to computer-implemented methods and systems for identifying a payment card transaction initiated with a specific payment card as being associated with an increased level of risk, and applying one or more rules to transactions initiated with the specific payment card.

Payment cards are used throughout the world, as a substitute for cash or checks, for financial transactions, as well as to enable cardholders to obtain cash, at banks, retail establishments, and/or automated teller machines (ATMs). Issuers of such payment cards maintain and operate networks to facilitate the processing of transactions involving their issued payment card. Such networks frequently are regional in nature, in that banks, retail establishments, and ATMs that are directly connected to a specific issuer may be limited to a region within a country, an international geopolitical region (such as a continent, like Europe), or an international economic region (such as the countries comprising the European Union), collectively referred to as a "geopolitical region."

Although a particular card issuer's "home" network may be confined to a specific country or region, cardholders of that issuer frequently are still able to use their payment cards in locations far removed from their "home" country or region and outside of their "home" network. Specifically, many card issuers have agreements with other issuers outside of their own networks to honor the use of each other's cards within their own networks in out-of-network transactions. Considered another way, a payment card issued from one geopolitical region may be used ("honored") in the ATMs, POS devices and other devices that are components of a network that is located in another geopolitical region. In that sense, the payment card may be considered "out-of-network."

Many payment cards are provided with one or more security devices, such as integrated circuit chips and/or magnetically-encoded strips ("magstrips") that are configured to communicate and exchange data with ATMs and point-of-sale ("POS") devices. For example, EMV-standard integrated circuit ("chip") cards carry both IC chips and magstrips. "EMV" stands for "Europay," "MasterCard®" and "Visa®," and is a global standard for inter-operation of IC cards and IC capable POS devices and ATMs, for authenticating credit and debit card transactions. Whether information from the chip or from the magstrip is used during a transaction depends, in part, on the location where the transaction is being initiated. For example, for an EMV card issued in a European country, transactions initiated within Europe will involve the activation of the chip. Information will be exchanged between the chip and the ATM or POS device. Approval of the transaction is provided through direct communication with the card issuer, presumably with a high degree of confidence in the validity of the card and the transaction.

When a "European" EMV card is used to initiate a transaction outside of Europe, however, the ATM or POS device may only engage the magstrip, which contains less information and/or information of a different character, than that obtainable through communication with the IC chip. In such transactions, the level of confidence that the card and/or transaction are legitimate is less. Payment cards bearing magstrips are frequently copied ("skimmed"). In addition, the personal identification ("PIN") numbers associated with payment cards are likewise frequently stolen. Accordingly, when a European EMV card is used to initiate a magstripe acquired cash withdrawal at an ATM located in New York City, for example, there is an increased potential that the transaction may be fraudulent. In particular, because the ATM or POS device at which the transaction is initiated is across the border from the region in which the card was issued, and the ATM or POS device is not chip-enabled and outside of and not connected to the "home" network. Accordingly, the information which the ATM or POS device can access is less than what would be available to a "home" or in-network ATM or POS device.

It would be desirable to provide an automated system that enables a card payment processing network to promptly identify an attempted transaction involving an "out-of-network" payment card as well as whether it was chip or magstripe acquired. It would also be desirable to provide an automated system that, after identification of such an out-of-network payment card, imposes one or more limits on the attempted transaction.

BRIEF DESCRIPTION OF THE INVENTION

In one embodiment, a computer-implemented method for mitigating fraud losses during a payment card-initiated transaction is provided. The method is implemented using a computer device coupled to a memory device. The method includes receiving an authorization request message requesting authorization of a transaction, the transaction initiated using a payment card that includes a first security device operable for transactions initiated within a predefined geographic region and a second security device operable for transactions initiated both within the predefined geographic region and outside of the predefined geographic region, wherein the transaction is initiated outside the predefined geographic region, and wherein the authorization request message includes first payment card data acquired from the second security device included on the payment card. The method further includes comparing the first payment card data to second payment card data stored in the memory device, the second payment card data corresponding to a plurality of payment cards previously-approved for transactions occurring outside of the predefined geopolitical region. The method further includes determining whether the first payment card data corresponds to one of the plurality of previously-approved payment cards. The method further includes applying a first set of transaction limit rules to the transaction if the first payment card data is determined to not correspond to one of the plurality of previously-approved payment cards. The method further includes applying a second set of transaction limit rules to the transaction if the first payment card is determined to correspond to one of the plurality of previously-approved payment cards.

In another embodiment, a computer system for mitigating fraud losses during a payment card transaction is provided. The computer system includes a processor and a computer-readable storage device having encoded thereon computer-executable instructions that are executable by the processor to perform functions including receiving an authorization request message requesting authorization of a transaction, the transaction initiated using a payment card that includes a first security device operable for transactions initiated within a predefined geographic region and a second security device operable for transactions initiated both within the predefined geographic region and outside of the predefined geographic region, wherein the transaction is initiated outside the predefined geographic region, the authorization request message including first payment card data acquired from the second security device included on the payment card. The computer-executable instructions further cause the processor to compare the first payment card data to second payment card data stored in the memory device, the second payment card data corresponding to a plurality of payment cards previously-approved for transactions occurring outside of the predefined geopolitical region. The computer-executable instructions further cause the processor to determine whether the first payment card data corresponds to one of the plurality of previously-approved payment cards. The computer-executable instructions further cause the processor to apply a first set of transaction limit rules to the transaction if the first payment card data is determined to not correspond to one of the plurality of previously-approved payment cards. The computer-executable instructions further cause the processor to apply a second set of transaction limit rules to the transaction if the first payment card is determined to correspond to one of the plurality of previously-approved payment cards.

In yet another embodiment, one or more non-transitory computer-readable storage media having computer-executable instructions embodied thereon for mitigating fraud losses during a payment card transaction are provided. The computing device includes a memory device and a processor. When executed by said processor, the computer-executable instructions cause said processor to receive an authorization request message requesting authorization of a transaction, the transaction initiated using a payment card that includes a first security device operable for transactions initiated within a predefined geographic region and a second security device operable for transactions initiated both within the predefined geographic region and outside of the predefined geographic region, wherein the transaction is initiated outside the predefined geographic region, the authorization request message including first payment card data acquired from the second security device included on the payment card. The computer-executable instructions further cause the processor to compare the first payment card data to second payment card data stored in the memory device, the second payment card data corresponding to a plurality of payment cards previously-approved for transactions occurring outside of the predefined geopolitical region. The computer-executable instructions further cause the processor to determine whether the first payment card data corresponds to one of the plurality of previously-approved payment cards. The computer-executable instructions further cause the processor to apply a first set of transaction limit rules to the transaction if the first payment card data is determined to not correspond to one of the plurality of previously-approved payment cards. The computer-executable instructions further cause the processor to apply a second set of transaction limit rules to the transaction if the first payment card is determined to correspond to one of the plurality of previously-approved payment cards.

DETAILED DESCRIPTION OF THE INVENTION

Figure 1:
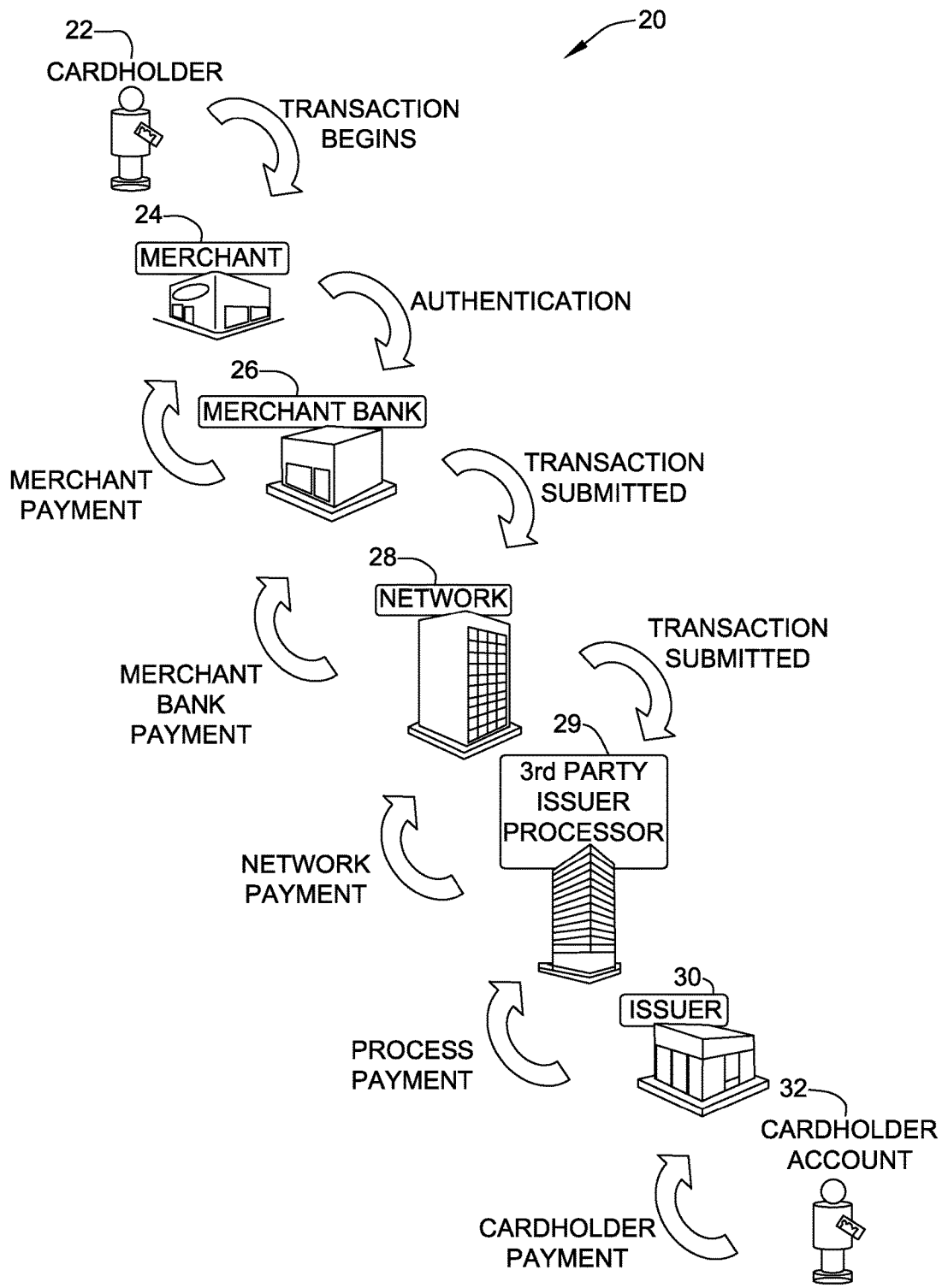
FIG. 1 is a schematic diagram illustrating an exemplary multi-party payment card industry system for enabling ordinary payment transactions in which merchants and card issuers do not necessarily have a one-to-one relationship.

The following detailed description illustrates embodiments of the invention by way of example and not by way of limitation. It is contemplated that the invention has general application to processing of payment card transactions. Embodiments of the present invention herein relate generally to a system for payment card transactions, wherein the payment card is issued by a card issuer that is not a member of a network with which a payment card authorization system is associated.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

The methods and systems described herein may be implemented using computer programming or engineering techniques including computer software, firmware, hardware or any combination or subset thereof, wherein the technical effect may be achieved by performing at least one of the following steps: (a) receiving an authorization request message requesting authorization of a transaction, the transaction initiated using a payment card that includes a first security device operable for transactions initiated within a predefined geographic region and a second security device operable for transactions initiated both within the predefined geographic region and outside of the predefined geographic region, wherein the transaction is initiated outside the predefined geographic region, the authorization request message including first payment card data acquired from the second security device included on the payment card; (b) comparing the first payment card data to second payment card data stored in the memory device, the second payment card data corresponding to a plurality of payment cards previously-approved for transactions occurring outside of the predefined geopolitical region; (c) determining whether the first payment card data corresponds to one of the plurality of previously-approved payment cards; (d) applying a first set of transaction limit rules to the transaction if the first payment card data is determined to not correspond to one of the plurality of previously-approved payment cards; (e) applying a second set of transaction limit rules to the transaction if the first payment card is determined to correspond to one of the plurality of previously-approved payment cards; (f) applying a first rule imposing a value limit on the transaction if the transaction is initiated outside of the predefined geopolitical region; (g) applying a second rule declining the transaction if a value of the transaction is in excess of the value limit; and (h) registering the payment card for approval for transactions outside of the predefined geopolitical region, if the first payment card data is determined not to correspond to one of the plurality of previously-approved payment cards.

As used herein, the terms "payment card," "financial transaction card," and "transaction card" refer to any suitable payment card, such as a credit card, a debit card, a prepaid card, a charge card, a membership card, a promotional card, a frequent flyer card, an identification card, a gift card, and/or any other device that may hold payment account data, such as mobile phones, smartphones, personal digital assistants (PDAs), key fobs, and/or computers. Each type of payment card can be used as a method of payment for performing a transaction. In addition, cardholder account behavior can include but is not limited to purchases, management activities (e.g. balance checking, bill payments, achievement of targets (meeting account balance goals, paying bills on time), and/or product registrations (e.g. mobile application downloads).

In one embodiment, a computer program is provided, and the program is embodied on a computer readable medium. In an exemplary embodiment, the system is executed on a single computer system, without requiring a connection to a server computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an exemplary multi-party payment card industry system 20 for enabling ordinary payment-by-card transactions in which merchants 24 and card issuers 30 do not need to have a one-to-one special relationship. Embodiments described herein may relate to a payment card system, such as a credit card payment system using the MasterCard® interchange network (MasterCard is a registered trademark of MasterCard International Incorporated located in Purchase, N.Y.). The MasterCard interchange network is a set of proprietary communications standards promulgated by MasterCard International Incorporated for the exchange of financial transaction data and the settlement of funds between financial institutions that are members of MasterCard International Incorporated. In a typical payment card system, a financial institution called the "issuer" issues a payment card, such as a credit card, to a consumer or cardholder 22, who uses the payment card to tender payment for a purchase from a merchant 24. To accept payment with the payment card, merchant 24 must normally establish an account with a financial institution that is part of the financial payment system. This financial institution is usually called the "merchant bank," the "acquiring bank," or the "acquirer." When cardholder 22 tenders payment for a purchase with a payment card, merchant 24 sends an authorization request message to a merchant bank 26 for the amount of the purchase. The request may be performed over the telephone, but is usually performed through the use of a point-of-sale device, which reads cardholder's 22 account data from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale device will be configured to communicate with the third party. Such a third party is usually called a "merchant processor," an "acquiring processor," or a "third party processor."

Using an interchange network 28, computers of merchant bank 26 will communicate transaction data with computers of an issuer processor 29 associated with an issuer 30. Issuer processor 29 may be a third party processor authorized to perform transaction-related services on behalf of issuer 30, including payment card production services, payment card processing services, fraud detection services, data delivery services, ATM driving services, transaction research, and cardholder support services. Issuer processor 29 may also provide interbank switch processing, including authorization, clearing and settlement, and value-added services. This enables issuer 30 to use one card processor for all different payment card brands. In an alternative embodiment, issuer processor 29 may be associated with interchange network 28 and may provide similar services.

Issuer 30 receives the transaction data from issuer processor 29, and then determines whether cardholder's 22 account 32 is in good standing and whether the purchase is covered by cardholder's 22 available credit limit. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale device. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer 30 stores the payment card data, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, issuer processor 29, and issuer 30. More specifically, during and/or after the clearing process, additional data, such as a time of purchase, a merchant name, a type of merchant, purchase data, cardholder account data, a type of transaction, itinerary data, data regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, interchange network 28, issuer processor 29, and issuer 30. Settlement refers to the transfer of financial data or funds among merchant's 24 account, merchant bank 26, issuer processor 29, and issuer 30 related to the transaction. Usually, transactions are captured and accumulated into a "batch," which is settled as a group. More specifically, a transaction is typically settled between issuer 30 and issuer processor 29, and then between issuer processor 29 and interchange network 28, and then between interchange network 28 and merchant bank 26, and then between merchant bank 26 and merchant 24.

Figure 2:
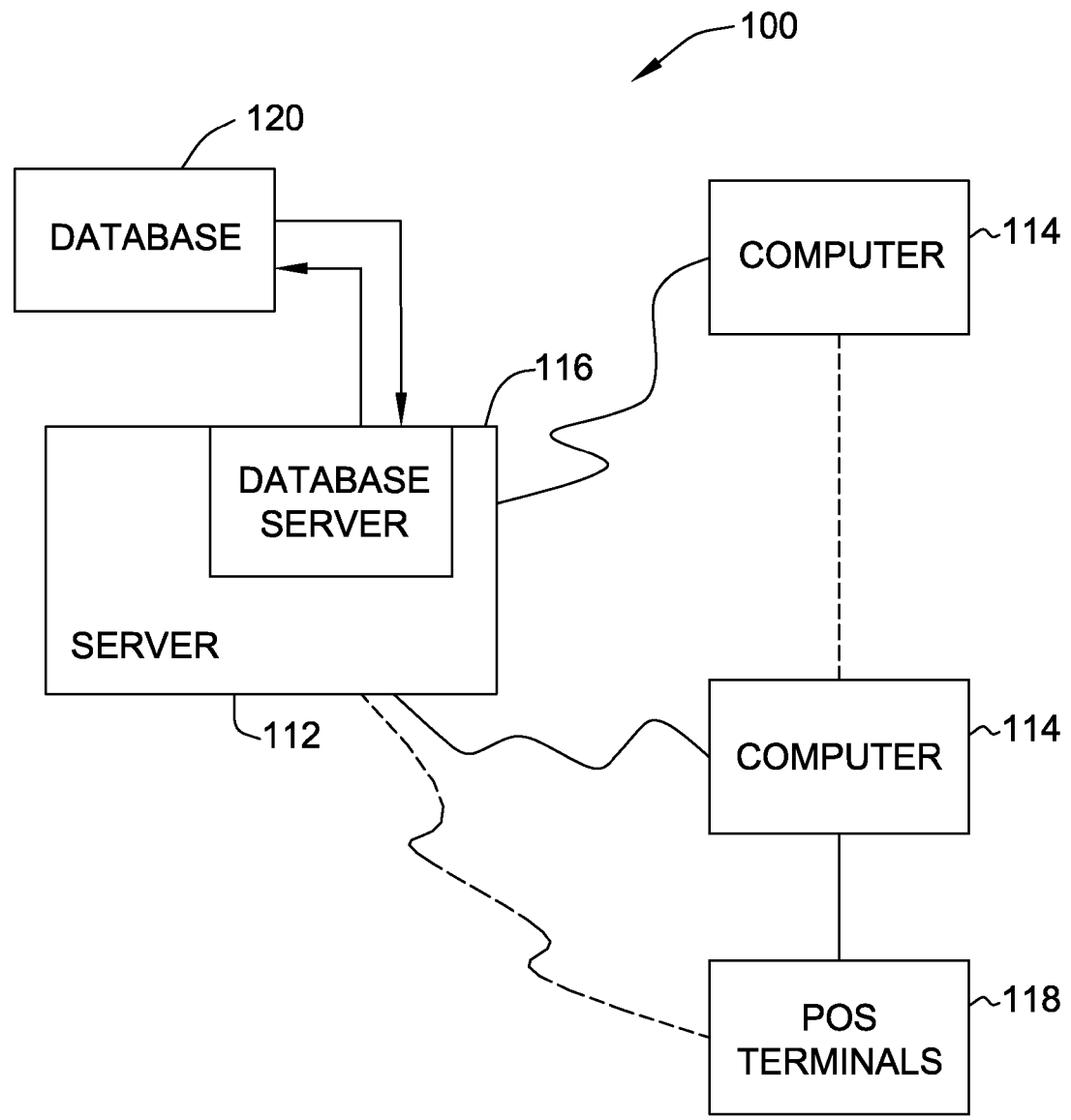
FIG. 2 is a simplified block diagram of an exemplary payment processing system, including a fraud control platform in accordance with one embodiment of the present invention.

FIG. 2 is a simplified block diagram of an exemplary payment processing system 100 in accordance with one embodiment of the present invention. In the example embodiment, system 100 is configured to process payment-by-card transactions, specifically cash withdrawals via ATM, determine whether a transaction is potentially fraudulent, and apply one or more sets of rules limiting what level of transaction will be approved, or whether the transaction will be declined.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes a point-of-sale (POS) device 118, which may be connected to client systems 114, and may be connected to server system 112. POS device 118 is interconnected to the Internet through many interfaces including a network, such as a LAN or a WAN, dial-in-connections, cable modems, wireless modems, and/or special high-speed ISDN lines. POS device 118 can be any device capable of interconnecting to the Internet and includes an input device capable of reading data from a cardholder's payment card. In one embodiment, device 118 is an automated teller machine (ATM) (shown in FIG. 6), configured to dispense cash and/or to perform other financial transactions, such as transfer of funds between accounts.

A database server 116 is connected to a database 120, which contains information on a variety of matters, as described below in greater detail. In one embodiment, database 120 is stored on centralized server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store cardholder account data including a name, an address, an account number, and other account identifier. Database 120 may also store merchant data including a merchant identifier that identifies each merchant registered to use the network, and instructions for settling transactions including merchant bank account data. Database 120 may also store purchase data associated with items being purchased by a cardholder from a merchant, and authorization request message data.

In the exemplary embodiment, one of client systems 114 may be associated with merchant bank 26 (shown in FIG. 1) while another one of client systems 114 may be associated with issuer 30 (shown in FIG. 1). POS device 118 is associated with a participating merchant 24 (shown in FIG. 1) or may be a computer system and/or mobile system used by cardholder 22 (shown in FIG. 1) making an on-line purchase or payment. In the exemplary embodiment, server system 112 is associated with interchange network 28. Server system 112 may be used for processing transaction data. In addition, client systems 114 and/or POS device 118 may include a computer system associated with at least one of an online bank, a bill payment outsourcer, a merchant bank, a merchant processor, an issuer associated with a payment card, an issuer processor, a remote payment system, and/or a biller.

Figure 3:
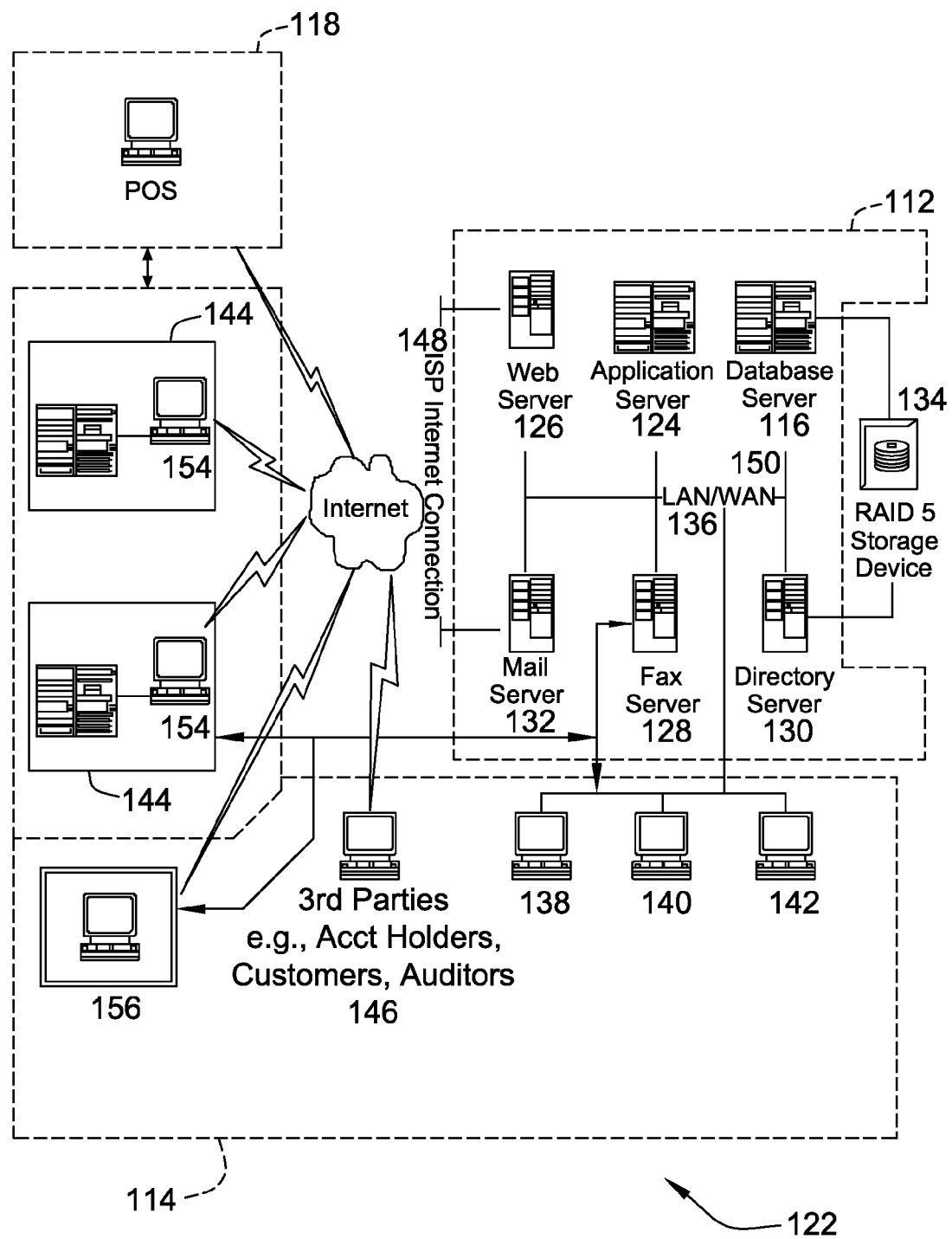
FIG. 3 is an expanded block diagram of an exemplary embodiment of a server architecture of a payment processing system including the fraud control platform shown in FIG. 2 in accordance with one embodiment of the present invention.

FIG. 3 is an expanded block diagram of an exemplary embodiment of a server architecture of a payment processing system 122 in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS device 118. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a LAN 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through the Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other WAN type communication can be utilized in other embodiments, i.e., the systems and processes are not limited to being practiced using the Internet. In addition, and rather than WAN 150, LAN 136 could be used in place of WAN 150.

In the exemplary embodiment, any authorized individual having a workstation 154 can access system 122. At least one of client systems 114 includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
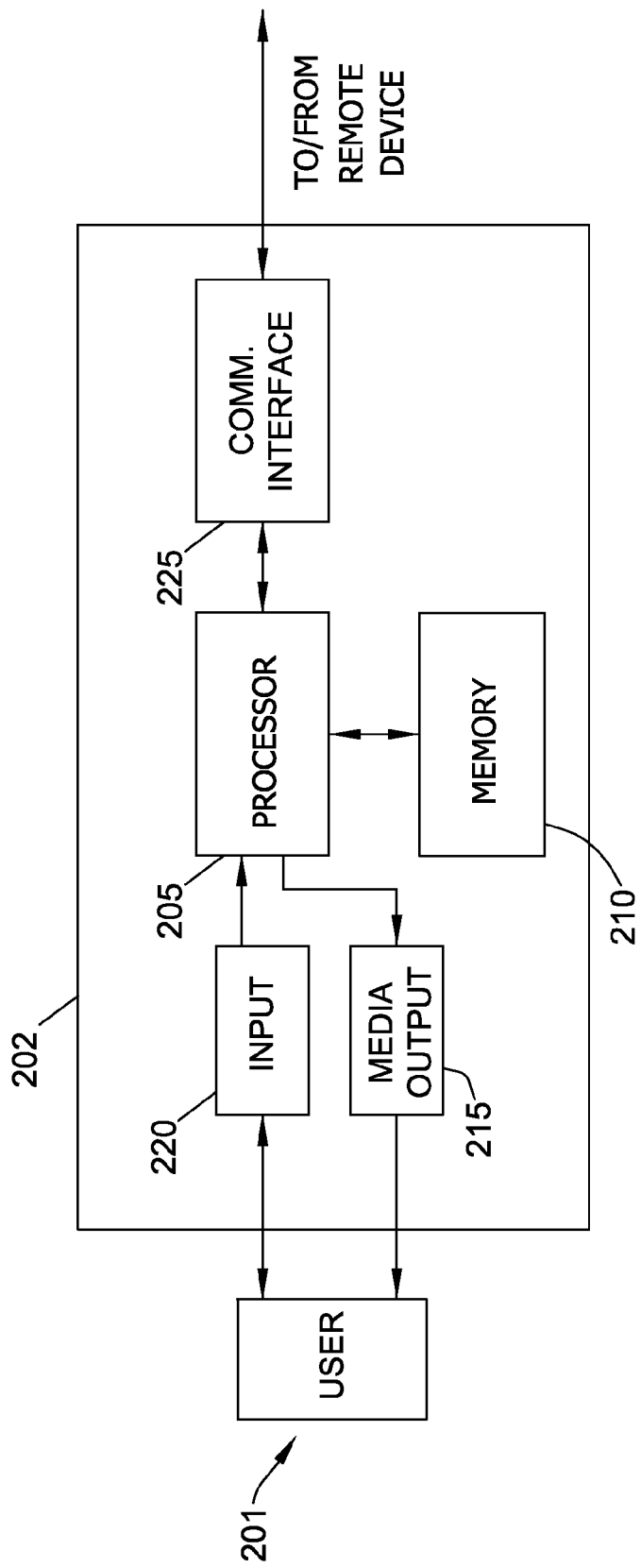
FIG. 4 illustrates an exemplary configuration of a client system shown in FIGS. 2 and 3.

FIG. 4 illustrates an exemplary configuration of a user system 202 operated by a user 201 in accordance with one embodiment of the present invention. User system 202 may include, but is not limited to, client systems 114, 138, 140, and 142, POS device 118, workstation 154, and manager workstation 156 (all shown in FIG. 3). In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively coupleable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively coupleable to a remote device such as server system 112. Communication interface 225 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
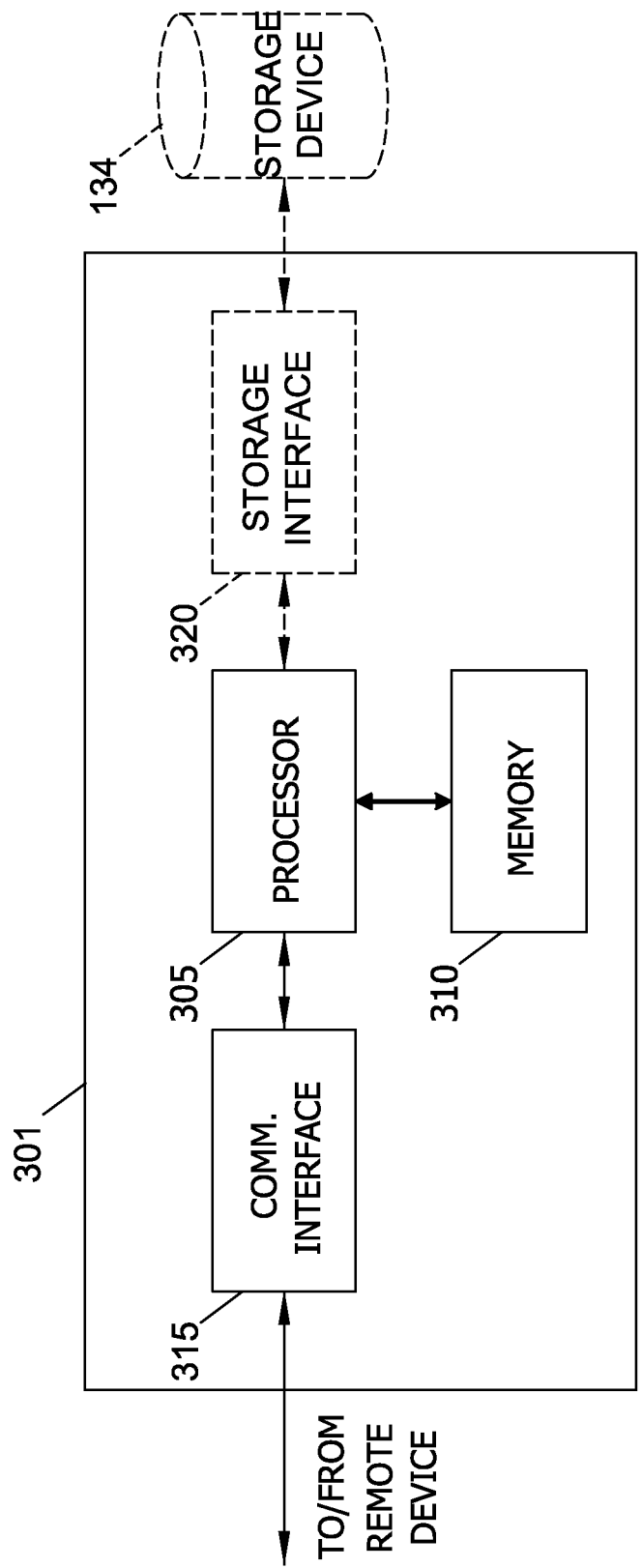
FIG. 5 illustrates an exemplary configuration of a server system shown in FIGS. 2 and 3.

FIG. 5 illustrates an exemplary configuration of a server system 301, such as server system 112 (shown in FIGS. 2 and 3). Server system 301 may include, but is not limited to, database server 116, application server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
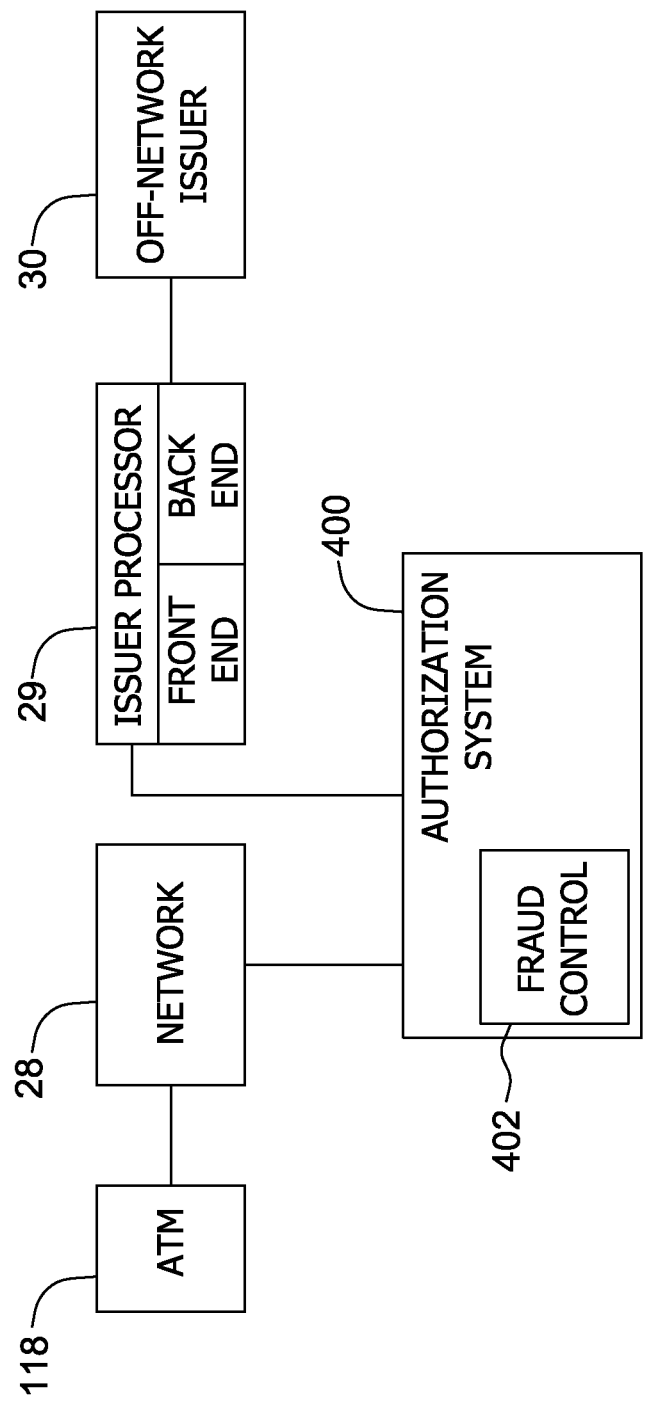
FIG. 6 is a simplified block diagram showing the flow of communications between the payment network shown in FIG. 1, and the fraud control platform shown in FIG. 2.

FIG. 6 is a simplified block diagram illustrating the flow of communications between interchange network 28, ATM 118, issuer processor 29, an off-network issuer 30, and fraud control system 402. In an exemplary embodiment of the invention, the functions of authorization system 400 are performed by server system 112 (illustrated in FIGS. 2 and 3), which may be part of a payment processing system 100.

In operation, a cardholder 22 (shown in FIG. 1) initiates a payment card transaction such as a cash withdrawal, at an ATM 118. Although the exemplary embodiment is described in the context of a transaction at ATM 118, it is to be understood that transactions initiated at other locations, such as at a POS terminal, wherein the transaction may be a straight purchase, or a purchase with cash back, in which situation the same or different limits could be applicable to the respective purchase and cash back portions of the transaction. In the exemplary embodiment, the payment card is issued by an issuer 30, located and maintaining a processing network in a predefined geopolitical region, for example, Europe (or a specific country within Europe), while ATM 118 is located in a different geopolitical region (for example, the United States). In the exemplary embodiment, the payment card is an integrated circuit ("IC" or "chip") card in accordance with the EMV standard, and carries both a chip and a magstrip. Depending upon the type and amount of the transaction, a signature and/or entry of a personal identification number ("PIN") may be required to complete the transaction. In the exemplary transaction, occurring outside of the predefined geopolitical region that is the "home" of card issuer 30, the chip embedded in the payment card is not operable. Therefore, reliance is placed on the magstrip on the payment card for purposes of verification and completion of the transaction.

An authorization system 400 receives an authorization request message via network 28 from ATM 118. Authorization system 400 invokes fraud control platform 402 to review data included in the authorization request message to determine which of a plurality of applicable fraud control rules, as described herein, applies to determine whether the transaction is approved.

Figure 7:
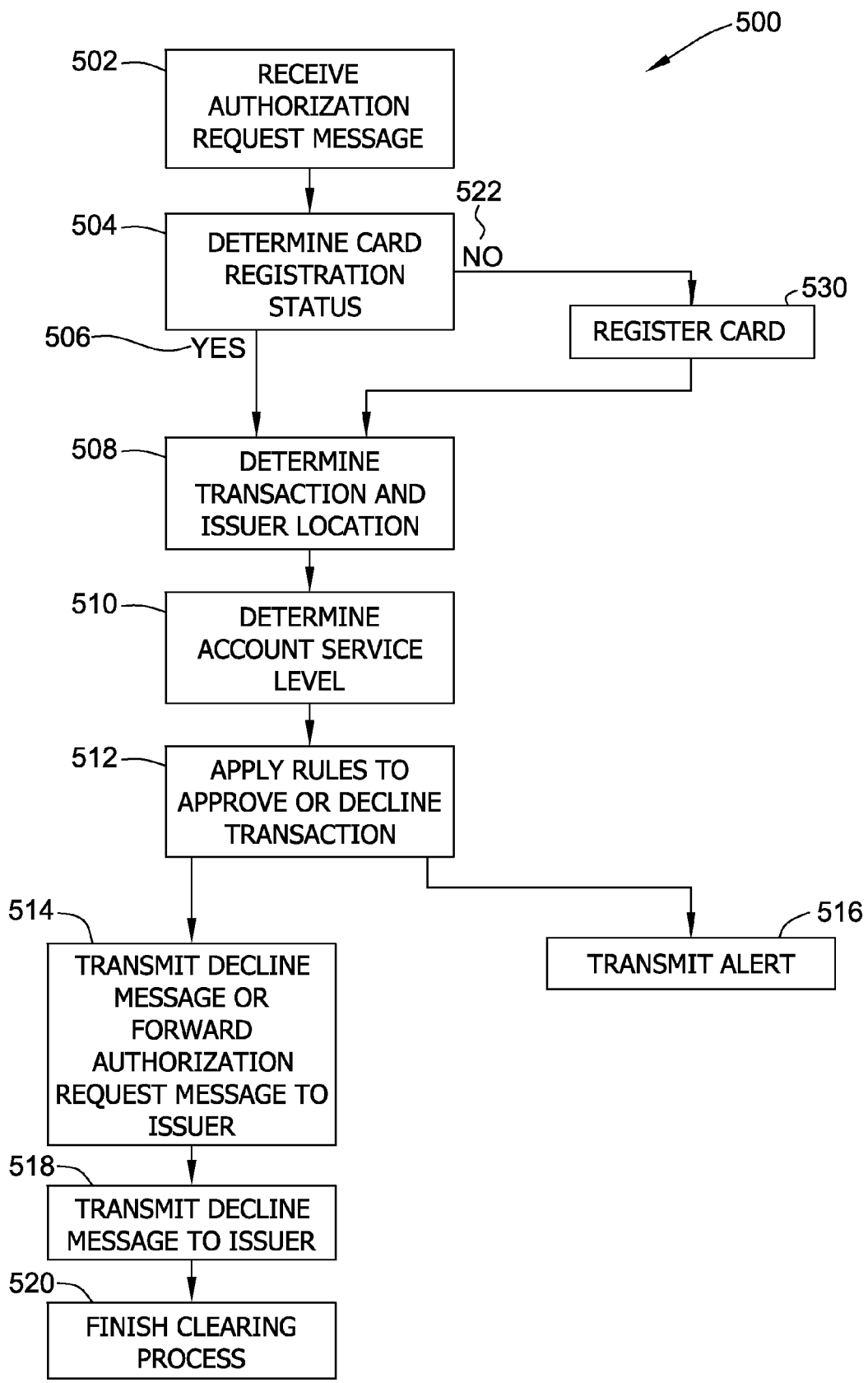
FIG. 7 is a flowchart illustrating an exemplary method for modifying a status of a payment card, in accordance with an exemplary embodiment of the invention.

FIG. 7 is a flowchart illustrating a method 500 for mitigating fraud losses during a payment card transaction. Authorization system 400 receives 502 an authorization request message via network 28 from ATM 118 regarding a transaction initiated by cardholder 22 using a payment card. As described herein, card issuer 30 is not directly affiliated with network 28. The authorization request message includes data acquired from the magstrip on the payment card, including the bank identification number (BIN). In the exemplary embodiment, the identity of the country or region of issuer 30 is determined by extrapolation by fraud control platform 402, working through network 28. In an alternative embodiment, the authorization request message includes data such as the country or region of issuer 30, and the location of ATM 118. Fraud control platform 402, in the exemplary embodiment, is a facility of authorization system 400. In the exemplary embodiment, issuer 30 is not a member of network 28 and accordingly, entities that are members of network 28, such as authorization system 400, do not have immediate access to data maintained by issuer 30. Authorization system 400 maintains, for example in database 120, information regarding payment cards issued by issuer 30, including BIN ranges. In the exemplary embodiment, the payment card information is updated periodically by issuer 30.

Included in the data embodied in the BIN ranges are account service level data. In the exemplary embodiment, payment cards issued by issuer 30 that are assigned different account service levels are accorded different levels of treatment, such as different amounts for daily, weekly, and/or monthly, etc. withdrawal limits. In addition, the level of transaction that is authorized (or not) may depend upon the locations of the card issuer 30 and ATM 118.

After receipt 502 of the authorization request, fraud control platform 402 compares the BIN contained in the authorization request message to ranges of BINs provided by issuer 30 and stored in database 120. Fraud control platform 402 additionally determines 504 from data contained in the authorization request message whether the card has a BIN that corresponds to one of the BIN ranges stored in database 120, representing a card that is "registered" with authorization system 400. If the card is registered 506, fraud control platform 402 determines 508, the location of the attempted transaction, and the location of issuer 30.

As described herein, payment cards issued from card issuers 30 that are located in a different geopolitical region than the location of the attempted transaction ("out-of-network" cards) are particularly vulnerable to theft through skimming or other mechanisms. Transactions that are initiated by out-of-network payment cards at network-affiliated ATMs 118 and non-chip configured POS terminals 118, where account data is acquired from the card via magstripe, are considered high risk transactions. Accordingly, one or more sets of rules are applied to govern how the transaction is processed, prior to or instead of forwarding the authorization request message to the card issuer, to mitigate losses in the event that the payment card used in the transaction is stolen or fraudulently duplicated. As an example, out-of-network card issuer 30 may be located in Germany Issuer 30 may have assigned a payment card to one of several account service levels (or profiles), for example: 1) a Standard level; 2) a Standard-Plus level (for occasional travelers); or 3) a Frequent Traveler level. For a Standard level card, transactions at ATMs outside of Europe may have specific amount limits, depending on the location where the transaction is being initiated. For example, transactions initiated in the US or in Asia Pacific countries may have a daily and/or weekly limit of US$450.00 per week, and attempted transactions in excess of those amounts will be declined. For the same card, in other non-European countries or regions, the limit(s) may be lower, or transactions may be declined entirely. For a Standard Plus card, the respective applicable transaction limit(s) may be higher. For a Frequent Traveler, or higher account service level card, there may be no daily or weekly limits imposed by fraud control platform 402. Instead, the authorization request message is simply forwarded to card issuer 30 for authorization processing.

Accordingly, after determining 504 the registration status of the card and determining 508 the transaction and issuer locations, fraud control platform 402 determines 510 the service level associated with the account service level associated with the within the participating BIN range to which the card belongs, and applies 512 the appropriate transaction limit rules, as described above, to either approve or decline the transaction. If the amount requested in the transaction exceeds the geo-regional limits for that account's service level, Fraud control platform 402 then transmits 514 a message back through network 28 to ATM 118 declining the transaction (in the event of a decline an advice message is also sent to issuer processor). Alternatively, fraud control platform 402 forwards 514 the authorization request message to issuer 30 for final approval. Fraud control platform 402 additionally may optionally transmit 516 an alert to the cardholder for example via SMS and/or email. Fraud control platform 402 then transmits 518 a message to card issuer 30, if appropriate, advising that the transaction was declined, optionally together with details regarding the attempted transaction. If fraud control platform 402 does not decline the transaction, the transaction is cleared 520 using ordinary procedures.

If at step 504, fraud control platform 402 determines 522 that the card initiating the transaction is not registered (i.e., that the card corresponds to an account that is in one of the BIN ranges stored in database 120, but has not yet been registered, or not yet assigned to a specific account service level or profile), fraud control platform 402 proceeds to register 530 the card used to initiate the transaction ("just-in-time" registration), storing the account number acquired from the card in database 120. Fraud control platform 402 then determines 508 the transaction and issuer locations, determines 510 the account service level associated with the BIN range to which the card belongs, applies 512 the appropriate transaction limit rules, as described above, to either approve or decline the transaction, and likewise proceeds through steps 514-520 as previously described. In the exemplary embodiment, the rules applicable to previously unregistered cards are more restrictive in terms of lower allowed amounts and/or countries or regions where the transaction will be automatically declined, than the rules applicable to previously registered cards.

In an alternative embodiment, fraud control platform 402 is configured to address contingency situations, such as a "stranded traveler" situation, in which a traveler requires increased spending limits. Another contingency situation occurs when a cardholder, in advance of travel, advises their card issuer of upcoming travel requiring a temporary upgrade in their account service level with the option of setting a pre-determined duration and auto reset back to the original service level. Accordingly, fraud control platform 402 is configured to receive messages from cardholders so that upon receipt of appropriate predefined identification, fraud control system 402 either automatically approves future transactions at a higher account service level, or sends a message to a customer service representative for follow-up contact with the card holder(s).

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense. For example, the present disclosure describes exemplary embodiments in the context of a payment card transaction in the form of a cash withdrawal from an ATM. In alternative embodiments, the payment card transaction may be a purchase of goods or services using a payment card.

As will be appreciated based on the foregoing specification, the above-described embodiments of the disclosure may be implemented using computer programming or engineering techniques including computer software, firmware, hardware or any combination or subset thereof Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described methods and systems provide for the identification of attempted transactions initiated with out-of-network payment cards, and the imposition of transaction limit rules on both registered and previously-unregistered out-of-network payment cards, to mitigate losses due to potential fraud. The methods and systems described herein further provide for just-in-time registration of previously-unregistered out-of-network payment cards.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for mitigating fraud losses during a transaction initiated at an ATM that is located outside of a predefined geographic region associated with an issuer of a payment card used in the transaction, the method implemented using an authorization computer device coupled to the ATM over an interchange network, the method comprising:

receiving, from an ATM located outside of a predefined geographic region associated with an issuer of a payment card, over an interchange network, an authorization request message requesting authorization of a transaction conducted using the payment card, wherein the payment card includes (i) a first security device comprising an integrated-circuit chip configured to communicate with automated teller machines and operable for transactions initiated within the predefined geographic region and (ii) a second security device comprising a magnetically-encoded strip readable by automated teller machines and operable for transactions initiated both within the predefined geographic region and outside of the predefined geographic region, wherein the authorization request message includes at least a transaction bank identification number (BIN) and a transaction account number acquired from the second security device included on the payment card, wherein the transaction BIN is associated with the issuer, wherein the issuer is not a member of the interchange network, and wherein the authorization computer device does not have access, over the interchange network, to data maintained by the issuer;

retrieving, from a database communicatively coupled to the authorization computer device, a plurality of ranges of BINs, wherein each of the plurality of ranges of BINs (i) corresponds to a plurality of payment cards previously-registered for transactions occurring outside of the predefined geographical region, and (ii) is associated with account service level data;

determining that the transaction BIN is included in one of the retrieved plurality of ranges of BINs;

determining whether the received transaction account number corresponds to one of the plurality of previously-registered payment cards that corresponds to the one of the plurality of ranges of BINs;

in response to determining that the transaction account number does not correspond to one of the plurality of previously-registered payment cards, registering the payment card by storing the transaction account number and transaction BIN in the database;

applying a set of transaction limit rules to the transaction based on the account service level data associated with the one of the retrieved plurality of ranges of BINs; and determining whether to approve the transaction based on the application of the set of transaction limit rules.

2. The method in accordance with claim 1, wherein applying the set of transaction limit rules includes applying a first rule declining the transaction if a value of the transaction is in excess of a value limit defined in the account service level data associated with the one of the retrieved plurality of ranges of BINs.

3. The method in accordance with claim 1, wherein the transaction is a cash withdrawal from the ATM.

4. An authorization computer system for mitigating fraud losses during a transaction initiated at an ATM that is located outside of a predefined geographic region associated with an issuer of a payment card used in the transaction, the authorization computer system coupled to the ATM over an interchange network and comprising:

a processor; and a computer-readable storage device having encoded thereon computer executable instructions that are executable by the processor to perform functions comprising:

receiving, from an ATM located outside of a predefined geographic region associated with an issuer of a payment card, over an interchange network, an authorization request message requesting authorization of a transaction conducted using the payment card, wherein the payment card includes (i) a first security device comprising an integrated-circuit chip configured to communicate with automated teller machines and operable for transactions initiated within the predefined geographic region and (ii) a second security device comprising a magnetically-encoded strip readable by automated teller machines and operable for transactions initiated both within the predefined geographic region and outside of the predefined geographic region, wherein the authorization request message includes at least a transaction bank identification number (BIN) and a transaction account number acquired from the second security device included on the payment card, wherein the transaction BIN is associated with the issuer, wherein the issuer is not a member of the interchange network, and wherein the authorization computer system does not have access, over the interchange network, to data maintained by the issuer;

retrieving, from a database communicatively coupled to the authorization computer system, a plurality of ranges of BINs, wherein each of the plurality of ranges of BINs (i) corresponds to a plurality of payment cards previously-registered for transactions occurring outside of the predefined geographical region, and (ii) is associated with account service level data;

determining that the transaction BIN is included in one of the retrieved plurality of ranges of BINs;

determining whether the received transaction account number corresponds to one of the plurality of previously-registered payment cards that corresponds to the one of the plurality of ranges of BINs;

in response to determining that the transaction account number does not correspond to one of the plurality of previously-registered payment cards, registering the payment card by storing the transaction account number and transaction BIN in the database;

applying a set of transaction limit rules to the transaction based on the account service level data associated with the one of the retrieved plurality of ranges of BINs; and determining whether to approve the transaction based on the application of the set of transaction limit rules.

5. The authorization computer system in accordance with claim 4, wherein the computer-executable instructions cause the processor to apply a first rule declining the transaction if a value of the transaction is in excess of a value limit defined in the account service level data associated with the one of the retrieved plurality of ranges of BINs.

6. The authorization computer system in accordance with claim 4, wherein the transaction is a cash withdrawal from the ATM.

7. One or more non-transitory computer-readable storage media having computer-executable instructions embodied thereon for mitigating fraud losses during a transaction initiated at an ATM that is located outside of a predefined geographic region associated with an issuer of a payment card used in the transaction, wherein when executed by a processor of an authorization computer device coupled to the ATM over an interchange network, the computer-executable instructions cause said processor to:

receive, from an ATM located outside of a predefined geographic region associated with an issuer of a payment card, over an interchange network, an authorization request message requesting authorization of a transaction conducted using the payment card, wherein the payment card includes (i) a first security device comprising an integrated-circuit chip configured to communicate with automated teller machines and operable for transactions initiated within the predefined geographic region and (ii) a second security device comprising a magnetically-encoded strip readable by automated teller machines and operable for transactions initiated both within the predefined geographic region and outside of the predefined geographic region, wherein the authorization request message includes at least a transaction bank identification number (BIN)

and a transaction account number acquired from the second security device included on the payment card, wherein the transaction BIN is associated with the issuer, wherein the issuer is not a member of the interchange network, and wherein the authorization computer device does not have access, over the interchange network, to data maintained by the issuer;

retrieving, from a database communicatively coupled to the authorization computer device, a plurality of ranges of BINs, wherein each of the plurality of ranges of BINs (i) corresponds to a plurality of payment cards previously-registered for transactions occurring outside of the predefined geographical region, and (ii) is associated with account service level data;

determining that the transaction BIN is included in one of the retrieved plurality of ranges of BINs;

determining whether the received transaction account number corresponds to one of the plurality of previously-registered payment cards that corresponds to the one of the plurality of ranges of BINs;

in response to determining that the transaction account number does not correspond to one of the plurality of previously-registered payment cards, registering the payment card by storing the transaction account number and transaction BIN in the database;

applying a set of transaction limit rules to the transaction based on the account service level data associated with the one of the retrieved plurality of ranges of BINs; and determining whether to approve the transaction based on the application of the set of transaction limit rules.

8. The computer-readable storage media in accordance with claim 7, wherein the computer-executable instructions cause the processor to apply a first rule declining the transaction if a value of the transaction is in excess of a value limit defined in the account service level data associated with the one of the retrieved plurality of ranges of BINs.

9. The computer-readable storage media in accordance with claim 7, wherein the transaction is a cash withdrawal from the ATM.

* * * * *